United States Patent [19]
Nichols

[11] Patent Number: 5,974,728
[45] Date of Patent: Nov. 2, 1999

[54] METHOD AND APPARATUS FOR THE NON-TOXIC CONTROL OF INSECTS AND WEEDS

[76] Inventor: James C. Nichols, 2815 Hillman St., Thousand Oaks, Calif. 91360

[21] Appl. No.: 08/870,772

[22] Filed: Jun. 6, 1997

Related U.S. Application Data

[63] Continuation-in-part of application No. 08/243,714, Jul. 10, 1995, abandoned.

[51] Int. Cl.⁶ ................................................ A01M 5/08
[52] U.S. Cl. ........................................................ 43/140
[58] Field of Search ...................... 43/139, 140, 132.1, 43/141, 142

[56] References Cited

U.S. PATENT DOCUMENTS

| | | | |
|---|---|---|---|
| 71,486 | 11/1867 | Hill et al. . | |
| 986,193 | 3/1911 | Meek | 43/140 |
| 1,948,228 | 3/1934 | Urban . | |
| 2,114,494 | 8/1938 | Hummel et al. . | |
| 2,179,766 | 11/1939 | Webb | 43/140 |
| 2,516,977 | 8/1950 | Gnoinsky | 43/140 |
| 2,517,292 | 8/1950 | Dewey | 43/140 |
| 2,580,813 | 1/1952 | Miller | 43/140 |
| 2,608,023 | 8/1952 | Dillon | 43/140 |
| 2,643,482 | 6/1953 | Wilson | 43/140 |
| 2,722,082 | 11/1955 | Nisbet | 43/140 |
| 4,370,534 | 1/1983 | Brandon . | |
| 4,815,234 | 3/1989 | Connolly . | |
| 4,817,329 | 4/1989 | Forbes . | |
| 4,825,582 | 5/1989 | Szynal | 43/139 |
| 4,843,752 | 7/1989 | Munemasa | 43/140 |
| 5,117,578 | 6/1992 | Theis | 43/140 |
| 5,214,876 | 6/1993 | Sukup | 43/140 |
| 5,297,730 | 3/1994 | Thompson . | |
| 5,319,878 | 6/1994 | Moffett et al. . | |
| 5,430,970 | 7/1995 | Thompson . | |
| 5,433,758 | 7/1995 | Thompson . | |
| 5,501,032 | 3/1996 | Pitman . | |

OTHER PUBLICATIONS

S.V. Bleshinskii, B.I. Imanakunov; K.S. Sulaimankulov, M.E. Vlascov, V.S. Gleshinskii, R.E. Zavodchikova; "The Thermochemical Method of Combatting Plant Pest Insects," *Izvestiya Akademii Nauk Kirgizskoi SSR*, No. 2, 37–39, 1983.

"Hot Water Controls Whitefly Infestations," *Greenhouse Manager*, Oct. 1994, p. 16.

Thomas S. Perring, Charles A. Farrar, Tom S. Bellows, Arthur D. Cooper, Russell J. Rodriguez; "Evidence for a New Species of Whitefly: UCR Findings and Implications"; *California Agriculture*, Jan.–Feb. 1993; p. 7.

"Whitefly in Hot Water", *Australian Horticulture*, Jan. 1995; p. 46.

*Primary Examiner*—Kurt Rowan
*Attorney, Agent, or Firm*—Oppenheimer Wolff & Donnelly LLP

[57] ABSTRACT

A method and apparatus for the non-toxic control of whitefly and other small bodied infestation insects on growing and cropping plants is provided. The apparatus comprises a vehicle element, the vehicle element being capable of being towed by a second vehicle through a field, at least one fan attached to the vehicle for pulling air and insects flying within the air from above the growing and cropping plants towards the vehicle, at least one heated grid element for heating the air that was pulled towards the vehicle by the fans, the heating element being attached to the vehicle, wherein the air is heated to a certain temperature such that substantially all of the insects flying above the growing and cropping plants are destroyed, but the cropping and growing plants are not destroyed. The method effectively eliminates all of the insect infestation in the treated areas without harming the growing and cropping plants.

6 Claims, 10 Drawing Sheets

METHOD AND APPARATUS FOR THE NON-TOXIC CONTROL OF INSECTS AND WEEDS

This is a continuation-in-part application of application Ser. No. 08/243,714, filed on Jul. 10, 1995 now abandoned.

FIELD OF THE INVENTION

This invention relates in general to a method and apparatus for the non-toxic control of whitefly and other small bodied infestation insects on growing and cropping plants and relates in particular to a method and apparatus utilizing the application of high temperature water and air for a period of time and at such a temperature and pressure that the insects, their eggs, and their larvae, will be destroyed while the plants will not be destroyed. The invention further relates to the control of weeds.

BACKGROUND OF THE INVENTION

One of the most difficult problems faced by farmers is the control of infestation insects on growing and cropping plants. Although farmers have been able to control such insects through the use of pesticides, the use of pesticides is known to be toxic to other plant and animal species, including humans. Because pesticides often seep into the ground water, they can travel from the crops and harm the entire environment surrounding the crops. Further, pesticides may not be the solution for eliminating all harmful insects. While some insects may be affected by the pesticides, others in the area may not be affected. Beneficial insects may be adversely affected. Insects may mutate and thus become resistant to the pesticides.

A good example of an insect that is not adversely affected by most pesticides is the whitefly. It is estimated that the whitefly caused over $500 million in damage to U.S. agricultural production in 1991 alone. Perring et. al., *Evidence For a New Species of Whitefly: UCR Findings and Implications*, California Agriculture, January–February 1993, p. 7. The whitefly harms crops by transmitting plant diseases, feeding on crops, and contaminating them with sticky sugars.

The difficulty in controlling the whitefly lies in the strength of their composition and ability to resist pesticides. First, in most cases, the whitefly's predator insects have been eliminated either by man's destruction of wetlands and streambeds that are habitats to beneficial predatory insects or by man's continual use of pesticides and herbicides. Further, the whitefly has shown the ability to produce a waxy enzyme that protects it against the penetration of conventional pesticides. Moreover, the whitefly has the ability to mutate and adjust its internal chemical balance to resist pesticides after a few generations of exposure. Lastly, the whitefly shows great strength in numbers due to their rapid reproduction rate combined with a tendency to accumulate on a host plant rather than voluntarily migrate far distances.

The whitefly does have some weaknesses that could be exploited in attempting to control their populations and eliminate them altogether from crop. For instance, whitefly are surface dwellers, i.e., they do not live below the ground. They have a very small body mass. Their main source of protection is the wax-like covering described above. They are soft-bodied and are a desirable food source for many types of predatory insects. Whiteflys tend to establish their residency, i.e., their life cycle adjusts to the life cycle of their host's ability to create food (field or tree crops). As is common to all living organisms, the whitefly's ability to live is dependent upon its ability to maintain specific body temperature, plus or minus a certain number of degrees.

S. V. Bleshinskii, et. al. of the Institute of Inorganic and Physical Chemistry, Academy of Sciences of Kirgiz SSR in the *Academy of Sciences of the Kirgiz SSR*, No. 2, pp. 37–39, 1983, described their discovery that, on a purely experimental basis, the temperature of water at which plants are not damaged upon contact, but insects are killed is 60–65° C., for a time period of 0.2 sec. All but one of their experiments utilized the addition of chemicals to the water, namely household soap. Although Bleshinskii et. al. may have recognized that insects could be eliminated with the use of heated water, Bleshinskii et. al. did not discuss the temperatures, times, apparatus, or other parameters necessary for the economically-feasible, large scale elimination of whitefly and other insects, without causing damage to the crops.

Further, Thompson, U.S. Pat. No. 5,297,730, has used heated water to control weeds and undergrowth, as well as insects. Although Thompson recognized that heated water can be useful to eliminate insects, Thompson made this recognition in conjunction with his use of heated water to eliminate the plants as well. Thus, Thompson's method and apparatus would be of no use in eliminating insects from crops, because the crops would be destroyed along with the insects.

Accordingly, it will be appreciated from the foregoing that there is a definite need for a method and apparatus for the non-toxic control of whitefly and other small bodied infestation insects on growing and cropping plants. The method should effectively eliminate all of the insect infestation in the treated areas, without harming the growing and cropping plants. The method should avoid all uses of pesticides or other chemicals that could cause harm to the environment, including groundwater. The method should also prevent the insects from being able to avoid the effect of the treatment by mutation in the body chemistry. The method should also not adversely affect the long-term activity of pollinating or beneficial predatory insects. Further, the materials, apparatus, and energy requirements of the method should be of such a cost that the process is economically feasible. The present invention meets these needs.

SUMMARY OF THE INVENTION

In accordance with the present invention, a method and apparatus for the non-toxic control of whitefly and other small bodied infestation insects on growing and cropping plants is provided. The method effectively eliminates all of the insect infestation in the treated areas without harming the growing and cropping plants. The method does not utilize any pesticides or other chemicals that could cause harm to the environment, especially the groundwater. The method further prevents the insects from being able to avoid the effect of the treatment by mutation in the body chemistry. The method does not adversely affect the long-term activity of pollinating or beneficial predatory insects. The materials, apparatus, and energy requirements of the method and apparatus are of such a cost that the method is economically feasible for achieving its goal.

The present invention utilizes both heated air and water, either separately, or in combination, to effectively eliminate the infestation of whitefly and other small bodied infestation insects on growing and cropping plants. The invention takes advantage of the differences between the mass and nervous systems of the insects and the plants being treated. The small body mass of the insects absorbs the heat of the water and air very quickly and elevates the temperature of the insect to an amount beyond that where the insect can survive much faster than in the plants. The cropping and growing plants to be treated in the present invention generally have a larger mass and slower nerve response than the insects and thus the plant will not register any adverse affects from the application of the hot water and air of the present invention.

In accordance with the present invention, an apparatus is provided which is configured to spray the insect-infected growing and cropping plants with low pressure water that has been heated to a temperature that will elevate the temperature of the body of the insects beyond the temperature at which it can survive. The water is applied for such a time period so as to elevate the temperature of the insects beyond their survivable temperature, but short enough so as to not elevate the temperature of the plants beyond their survivable temperature. Because the insects have a body of much smaller mass than the plants, this time period and temperature has been found to occur at a temperature of between about 150° F. and 170° F. and at a time period of no more than a few seconds. Of course, the temperature and time period will vary depending on the species of the insect and on the species of the plant.

In another preferred embodiment of the present invention, heated air is used to eliminate the insects that are flying above the crop plants. The heated air may be used in combination with heated water that is applied to the plants themselves to eliminate the insects, their larvae, and eggs located on or near the plants. In yet another embodiment of the present invention, the heated air may be applied directly to the ground soil prior to cultivation of the soil, in order to eliminate any weeds, insects, larvae, and eggs remaining in the soil.

The method of the present invention is useful in that the treatment has been found to eliminate future generations of the insects, as well as the present generation. In addition to eliminating the adult insects, the hot water application of the present invention traumatizes the eggs and larvae of the insects as well. Thus, the method of the present invention eliminates all stages of infestation and is most effective when applied after the insect has fully established itself for a particular season. For instance, if the infested fields are treated just prior to cultivation and replanting, then next season the crops will show little or no infestation. In the case of the whitefly, this is most likely due to the fact that the whitefly is a surface dweller, whose eggs are present from the following season, but remain dormant until the new food source is available.

It should be noted that the method of the present invention is carried out and successfully eliminates the unwanted insect infestation without the use of pesticides. The method is chemical-free. Thus, the method does no harm to the environment or the groundwater in the vicinity of the infested crops. This is a very important aspect of the present invention, because to date, all known methods for the control and/or elimination of insects in growing and cropping plants involve the use of some form of a chemical.

Other objects, features, and advantages of the present invention will become apparent from a consideration of the following detailed description.

DETAILED DESCRIPTION OF THE PREFERRED EMBODIMENTS

The present invention is embodied in a method and apparatus for the non-toxic control of whitefly and other small bodied infestation insects on growing and cropping plants. The method effectively eliminates all of the insect infestation in the treated areas. The method does not utilize any pesticides or other chemicals that could cause harm to the environment, especially the groundwater. The method further prevents the insects from being able to avoid the effect of the treatment by mutation in the body chemistry. The method does not adversely affect the long-term activity of pollinating or beneficial predatory insects. The materials, apparatus, and energy requirements of the method and apparatus are of such a cost that the method is economically feasible for achieving its goal.

Figure 1:
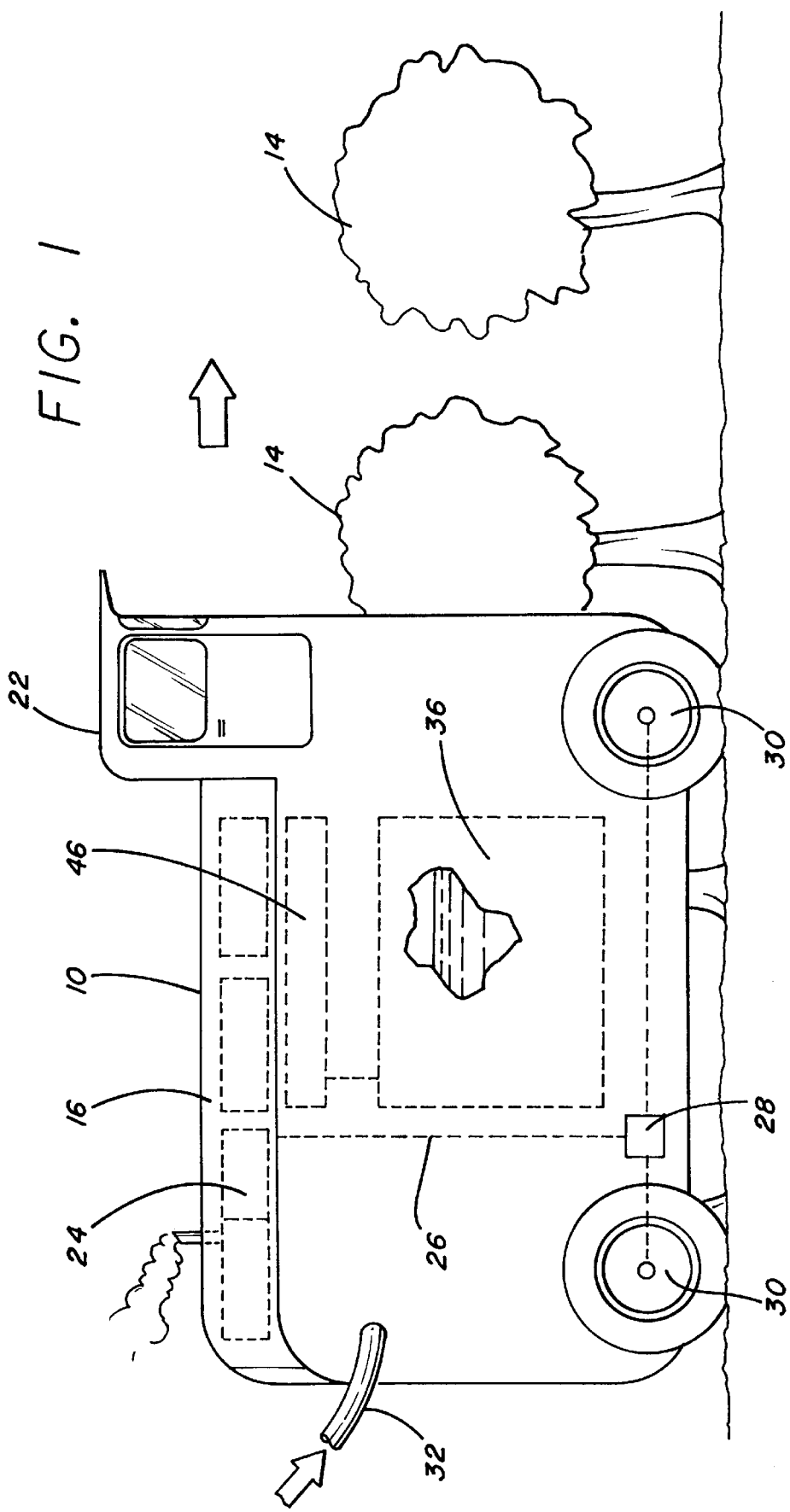
FIG. 1 is a side view with a partial cut-away and partial phantom view of one embodiment of the present invention.
Figure 2:
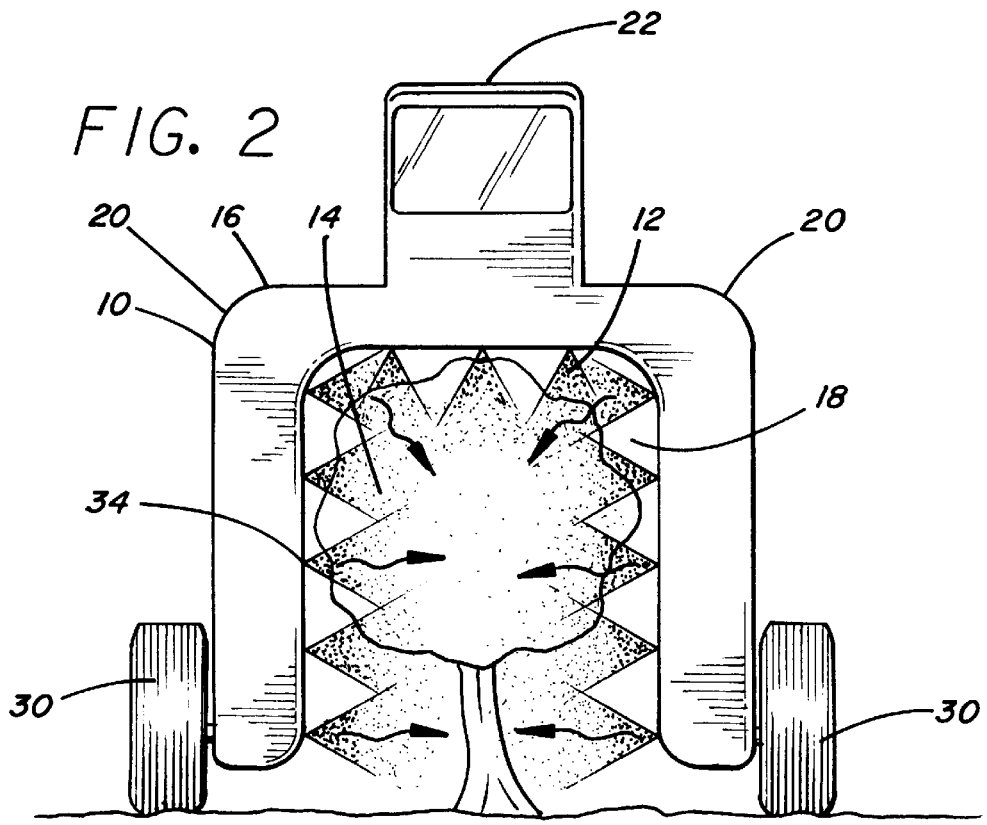
FIG. 2 is a front view of one embodiment of the present invention.

In one particular embodiment shown in FIGS. 1 and 2 of the drawings and herein described, a vehicle 10 is provided for spraying hot water 12 on and around growing and cropping plants 14 and trees. The vehicle 10 has a curved body 16 having an interior portion 10, much like a pruning vehicle, as is well known to those of ordinary skill in the art. The vehicle 10 may be driven over the growing and cropping plants and trees 14. Each of the two corners 20 of the vehicle are rounded to prevent the possibility that a sharp corner could be caught on a branch of the tree over which the vehicle 10 is passing. The vehicle further includes a driver cab 22 on its upper portion wherein the driver of the vehicle preferably sits while operating the vehicle. The vehicle is preferably powered by an engine 24 which transmits a torque to a drive shaft 26 and then through a universal gear 26 to all four of the wheels 30 of the vehicle. The engine 24 can be either a six cylinder engine or a diesel engine. The vehicle 10 may also be attached by a hose or other means 32 to an accompanying water tank truck (not shown) and may also be pulled by the water tank truck. The water tank truck may supply water to the vehicle for application to the crops. The vehicle 10 may be of any standard size that will allow the plant or tree being treated to fit within the interior of the vehicle.

On the inside surface of the interior of the vehicle, there are located hot water sprayer jets 34 for spraying the hot water 12 onto and around the plants. The sprayer jets 34 may be any sprayer jet known to those of ordinary skill in the art that can spray a pulsating spray of heated water onto the plants or trees 14. The water 12 that is sprayed onto the plants and trees is drawn from a water tank truck that is attached to the vehicle into the vehicle through a water intake 32. The water from the truck enters into a water supply tank 36 located within the vehicle.

Figure 3:
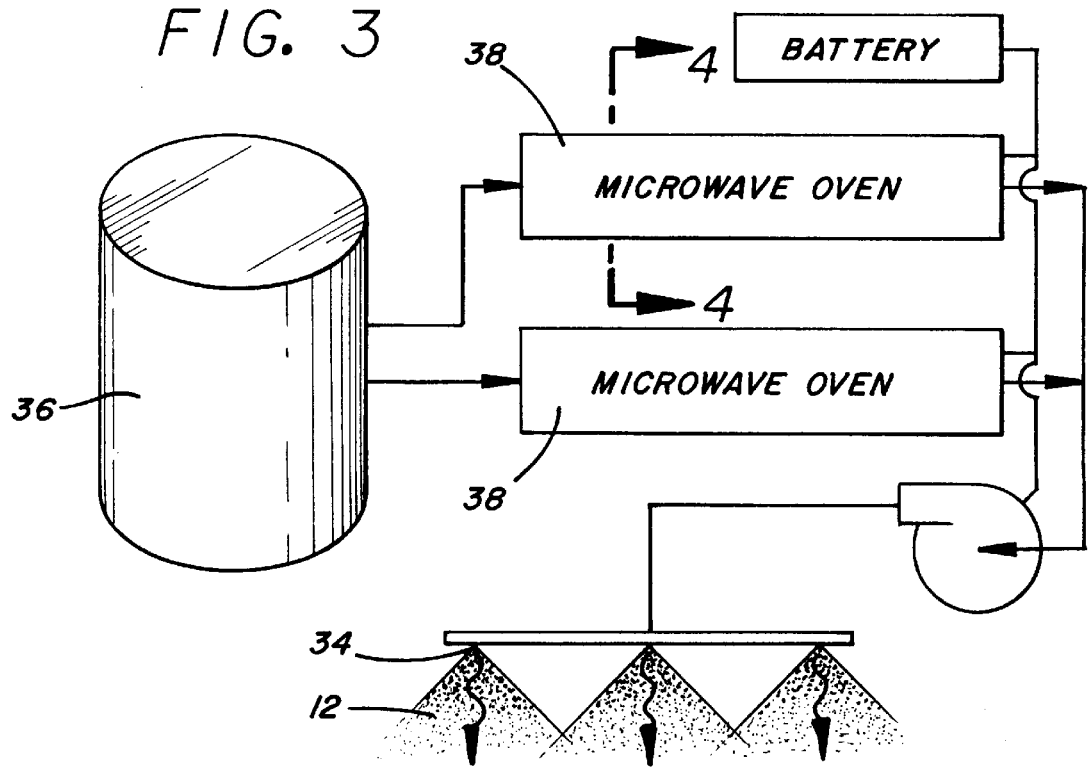
FIG. 3 is a schematic drawing of the internal features of the vehicle of one embodiment of the present invention.
Figure 4:
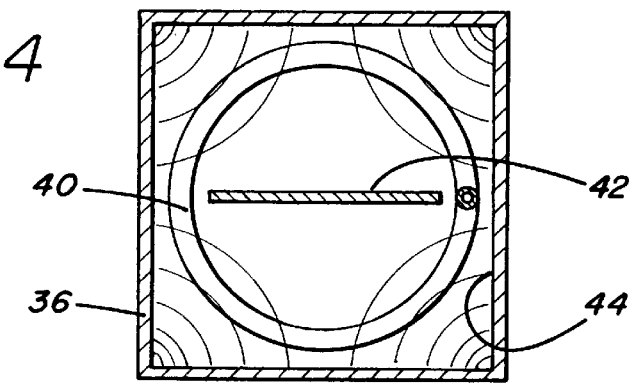
FIG. 4 is a cross-sectional view taken along the line 4—4 of FIG. 3 of the piping within the microwave oven shown in FIG. 3 used to heat the water.

Before passing through the sprayer jets 34, the water is heated in the vehicle 10. In one embodiment, the water passes through the intake to a pair of plastic coils 40, each of which are located within a microwave oven 38, which heat the water to a temperature of approximately 150° C. (FIGS. 3 and 4). Microwave ovens should not be used in conditions where there is the possibility of leaking, however, where the microwave ovens can be enclosed around the coils, it is acceptable. The coils 40 are made of plastic to allow the microwaves to pass through the coils and into the water contained therein. A reflective surface 42 should be in the center of the water coils and on the walls 44 of the microwave oven to increase the efficiency of the oven. While metals do not absorb heat, paper, glass, and most plastics allow microwave to pass through, allowing the water to absorb the energy produced by the microwave.

Alternatively, instead of the microwave ovens, the water may be heated by passing the water over or through heated pumping, grills, or other types of grids as is well known to those of ordinary skill in the art. These pipes grills, or grids may be heated by the use of an exothermic paint that is painted onto the surface of the metal grids. The exothermic paint will permit the grids to be heated to these high temperatures with the use of a small electrical current through the paint. The exothermic paint is capable of reaching high temperatures when a small current is passed through the paint or the substrate on which the paint covers. Such paint provides the benefit of the reduction of operating costs and increased efficiency. The exothermic paint is manufactured by Rustol of Tochigi, Japan. The person to contact at Rustol regarding the Rustol paint is Mr. Fuji Mura at 81-338-635-296. The piping, grills, and grids may be formed from any heat conducting substrate that can withstand the high temperature generated by the exothermic paint. Such substrates are preferably metals or any other composite material having the requisite properties, as is well known to those of ordinary skill in the art.

After being heated to the proper temperature, the heated water then passes to a compressor 46 and is sprayed out the sprayer jets 34. The compressor 46 may be any compressor that is capable of providing a pulsating stream of the heated water, as is well known to those of ordinary skill in the art.

The vehicle may further include swing arms at its rear for spraying a superhot ground spray of water. The water supplied to the swing arms is the same heated water that is sprayed onto the growing crops and trees. The apparatus contained on the vehicle may be powered by a generator located on the accompanying water supply vehicle.

Figure 5:
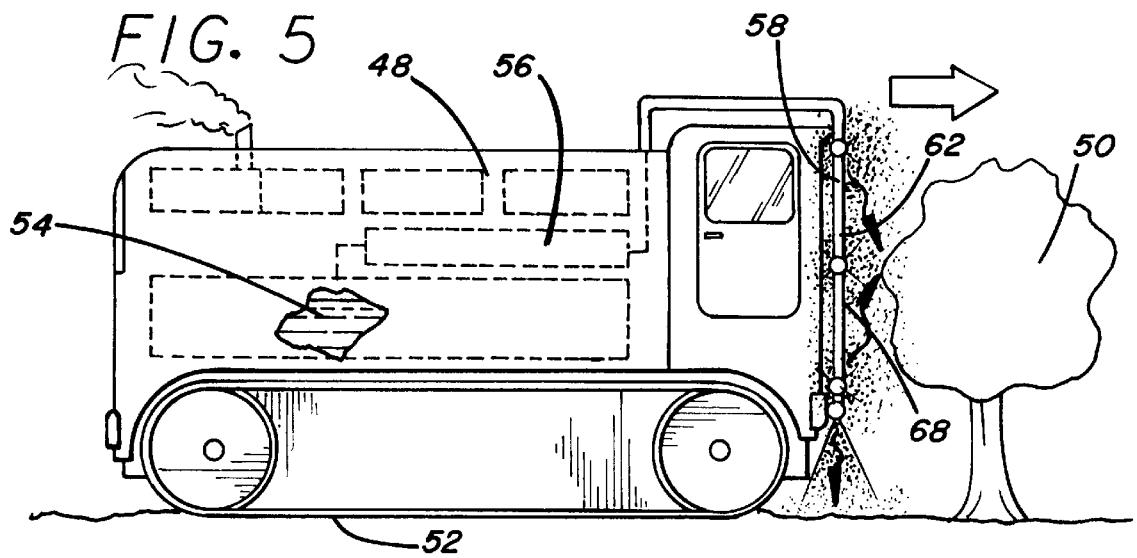
FIG. 5 is a side view with a partial cut-away and partial phantom view of one embodiment of the present invention.
Figure 6:
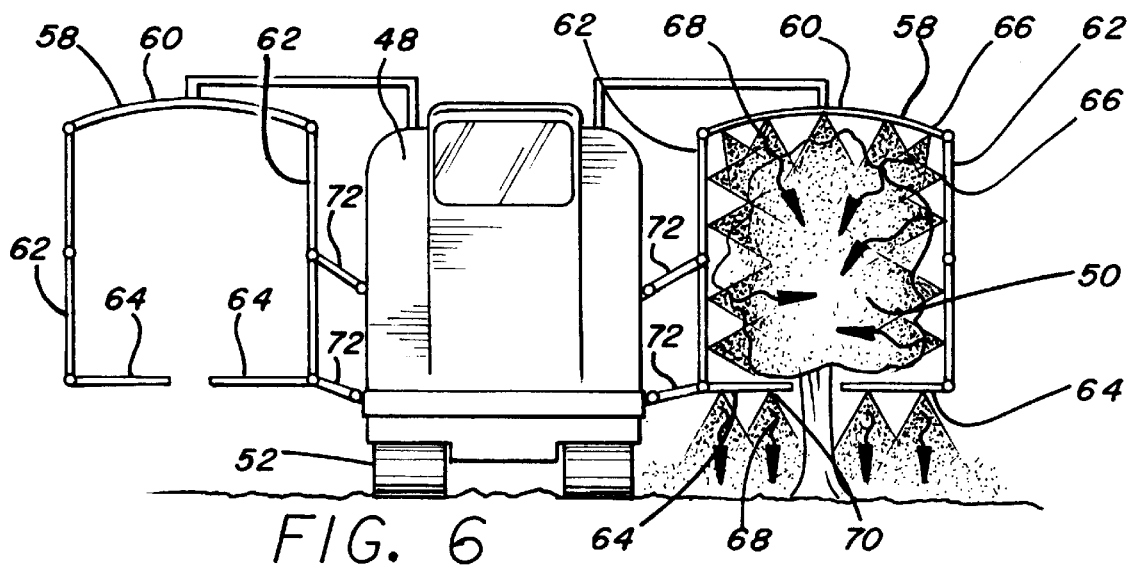
FIG. 6 is a front view of another embodiment of the invention showing the swing arms spraying water over and beneath a tree.

In another embodiment of the present invention shown in FIGS. 5 and 6, the vehicle is of such a size that it will be sufficiently narrow to fit between the rows of growing crops 48 and plants 50 in the field. The vehicle 48 may be propelled by tank tracks 52 rather than wheels, which are shrouded to prevent tangles and add maneuverability.

In this embodiment, the water in the tank 54 of the vehicle 48 is heated in the vehicle as it passes through plastic coils that are heated by a microwave oven 56 or by the combination of the exothermic paint on the metal piping, grills, or grids, in the same manner as discussed above. The water is then pumped through a hose and into the piping of the swing arm 58. The spring arm has a top section 60, two side sections 62, and two bottom sections 64, each of which are formed of piping to allow the water to flow through the sections.

Each of the top 60 and side sections 62 of pipes has nozzles 66 located on its inside surfaces for spraying the heated water 68 onto the trees or crop plants 50 located within the swing arm 58 as the swing arm 58 passes over and around the trees and plants 50. Each of the bottom sections 64 of the swing arms 58 have nozzles 70 on their outside surfaces for spraying the heated water 68 onto the ground around the trees or crop plants 50 located under the swing arm as the swing arm passes over and around the trees and plants. The nozzles are adjustable so that the amount of spray and the direction of the spray may be adjusted, or so that the spray may even be turned off. Each of the pipes of the sections of the swing arm 58 are detachable so that extra sections of pipe containing nozzles can be inserted or removed from the swing arm to permit the height and width of the swing arm to be varied according to the height and width of the trees and plants.

The swing arm 58 is preferably attached to the vehicle 48 at least one side section of the vehicle. The connecting arms 72 of the swing arms 58 are telescoping to allow each swing arm to be moved further from or closer to the vehicle 48, as necessary. Further, the connecting arms 72 are removable to allow the vehicle to operate with other machines. In another embodiment of the present invention, a swing arm 58 will be located on both sides of the vehicle 48 to permit the spraying of trees and plants 50 on both sides of the vehicle 48 at the same time.

Figure 7:
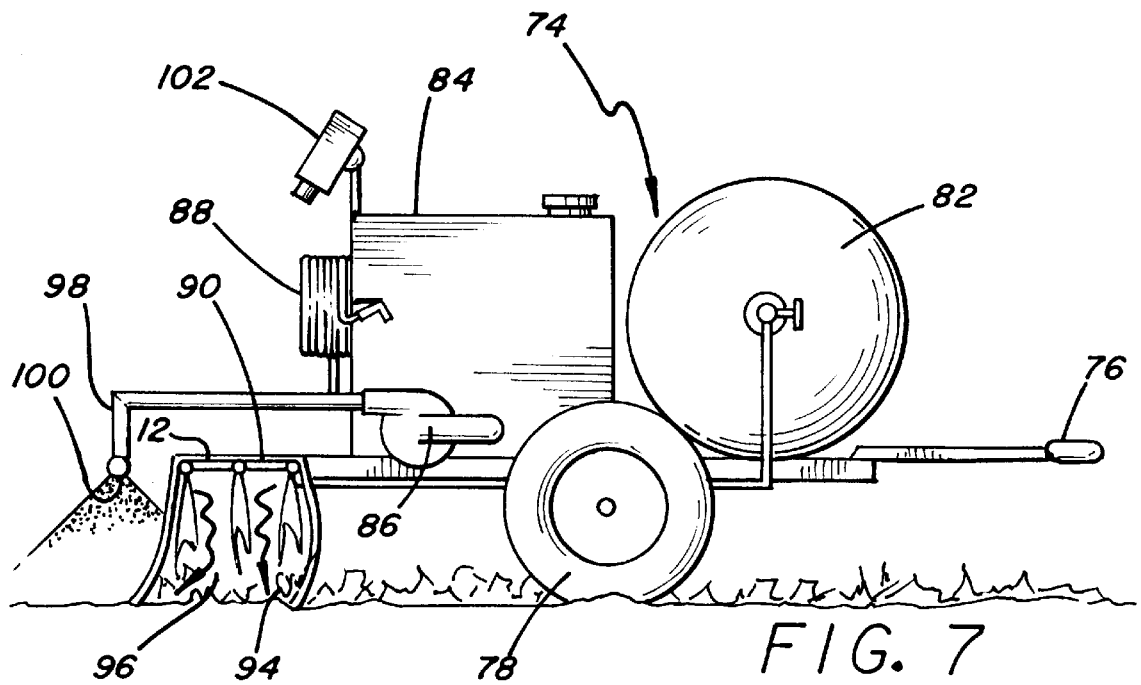
FIG. 7 is a side view of another embodiment of the present invention that is pulled by a vehicle.
Figure 8:
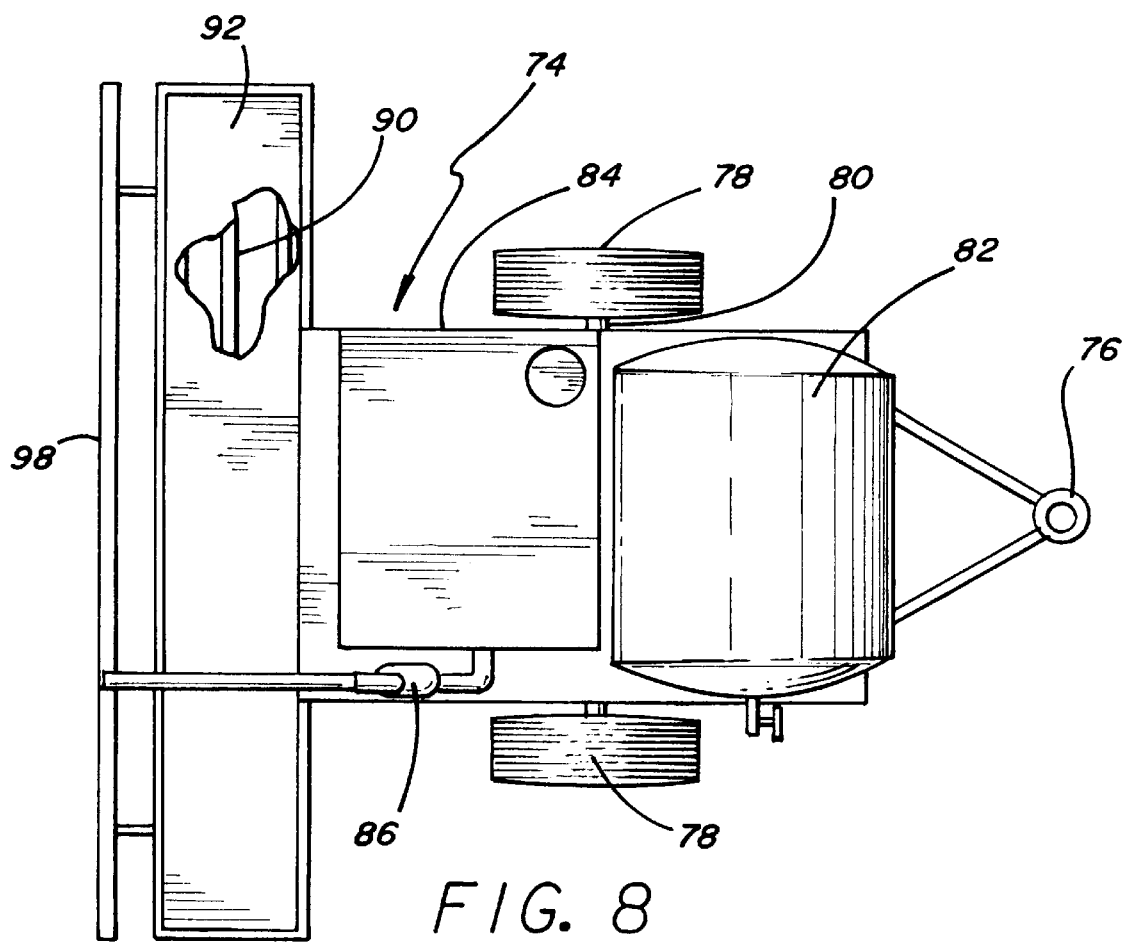
FIG. 8 is a top view of the embodiment of the present invention shown in FIG. 7.

In yet another embodiment of the present invention shown in FIGS. 7 and 8, a machine is provided for control of whitefly on low lying plants and crops, such as melons, gourds, or hay by spraying heated water and/or applying flames onto infested fields between the planting of crops prior to cultivation of the land. The machine is embodied in a trailer 74 that can be attached by a military ring hitch 76 to a tractor or truck. The trailer has a pair of wheels 78, which are placed on an adjustable axle 80 to adjust the width of the axle to permit the trailer 74 to fit between different size rows of crops. The tractor or truck is driven by the user who will be able to control the functions of the trailer 74 from the tractor or truck. The trailer has a tank 82 for storing and distributing high pressure fuel gases, such as propane, methane, or natural gas, or any other type of fuel. The trailer further has a tank 84 for storing and distributing water, a pump for pressurizing the water 86, and a hose 88 for providing an additional source of water for safety purposes. The trailer further has a series of detachable jetted flame bars 90 at its rear, which are covered by a flame shroud 92. The flame shroud may be placed at a safe distance from the ground and may be skirted with a flexible flameproof material 94 to retain maximum heat directed onto the ground. The jetted flame bars emit flames 96 that are fueled by the fuel gas provided by the tank 82. The flames 96 from the jets 90 will effectively kill the whitefly, their eggs, and larvae contained in and on the soil. The flames will also eliminate all young weeds. The flames may be replaced by heated water sprays onto the soil and/or crops. A water pipe 88 runs along the rear end of the trailer, the pipe having openings 100 so that water from the water tank can be pumped onto the ground as the rear of the trailer passes over the ground that has been treated with the flames. The water can extinguish any burning debris.

For fire safety reasons, the flames should only be used under certain conditions of humidity. When a flame is used, a video camera 102 may be placed onto the trailer to permit the driver of the tractor or truck to view on a monitor in the truck the extent of the flames and whether any damage or safety problems will have arisen. Further, the flames 96 should never be used in fields having overgrown weeds or excess debris from the previous crop. If necessary, the field can be mowed and raked and the debris burned in piles prior to the use. The field should not be cultivated, however, prior to heat treatment, because cultivation will bury the whitefly eggs in the soil and thus protect them from the flames, thereby permitting the eggs to survive the flames and then hatch to infest the next crop.

Figure 9:
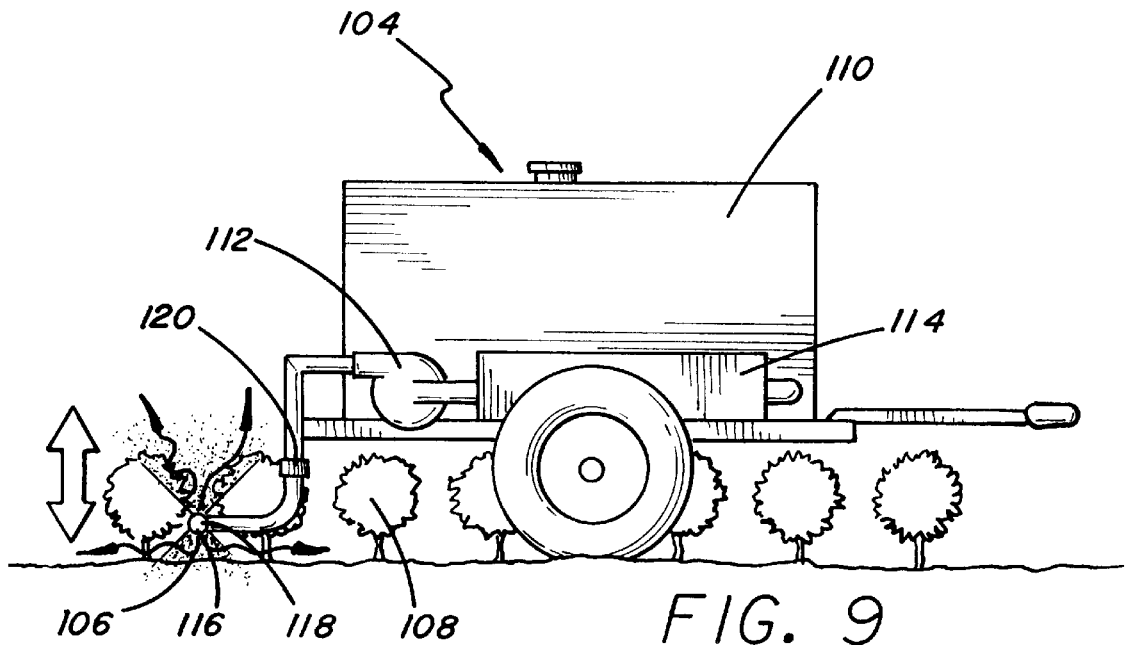
FIG. 9 is a side view of another embodiment of the present invention.
Figure 10:
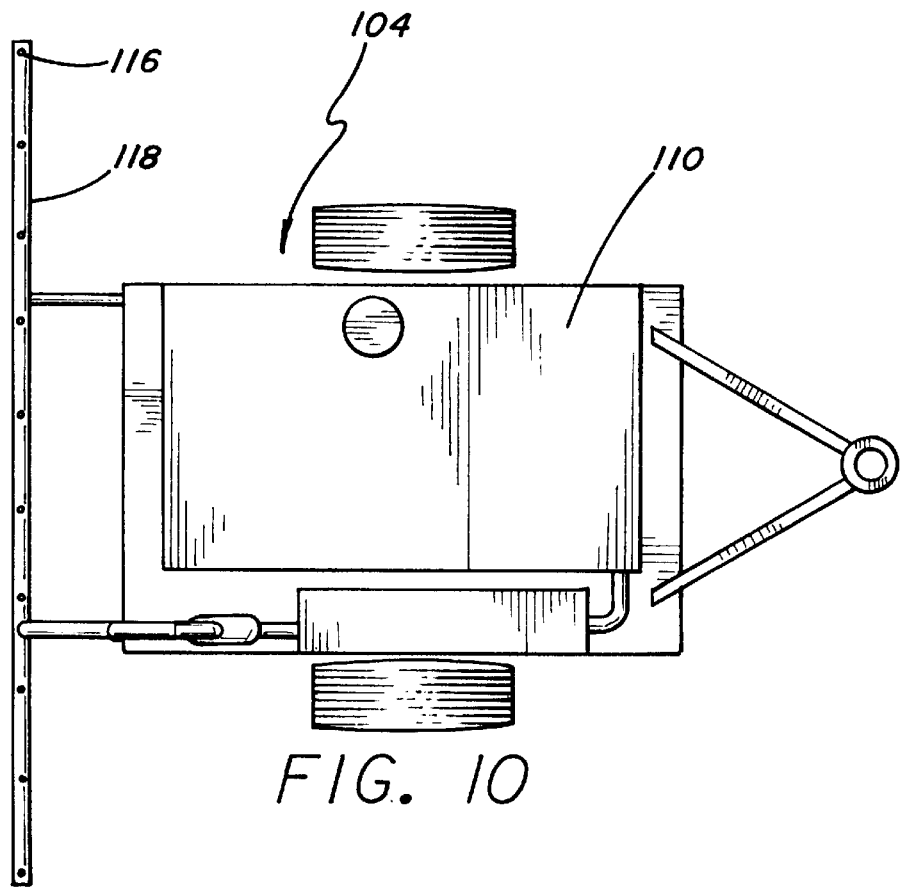
FIG. 10 is a top view of the embodiment of the present invention shown in FIG. 9.

In another embodiment of the present invention shown in FIGS. 9 and 10, the trailer 104 can spray heated water 106 onto the crops 108 and ground to kill the whitefly and other infestation. The water will be provided from a supply tank 110 contained on the trailer 104 or a supply tank contained on an accompanying water supply vehicle. The water is heated as it is passed through plastic coils and will be heated in a microwave oven 114 or by passing over or through piping, grills, or grids painted with the exothermic paint, in the same manner as described above. In this embodiment of the present invention, the water is preferably heated to a temperature of approximately 230° F. A compressor 112 will raise the pressure of the water so that the water will be pulsated through the piping and out the nozzles 116 contained on the water bars 118 which are attached to the trailer. The nozzles 116 are rotary or fan type nozzles, as is well known by those of ordinary skill in the art. The user will chose the type of nozzle 116 and the setting of the nozzle depending on the type of crop to be treated. Further, the nozzles 116 may be extendable for selectively lowering the nozzles so that the water may be sprayed beneath the leaves of the crop plants 108 to treat these areas and eliminate insects, eggs, and larvae located underneath the leaves. The pressure provided by the compressor and the configuration of the nozzles will provide a stream of heated water that will pulsate. The pulsation of the water will conserve water while at the same time greatly increasing the impact of the water on the insects and their eggs that adhere to the trees and their leaves. The sprayer configuration of the water pipes 118 may also have nozzles facing upwardly and downwardly to enable the water to be sprayed onto the tops and bottoms of the leaves of the crops. The height of the water bars 118 are adjustable by a collar and pin 120.

Figure 11:
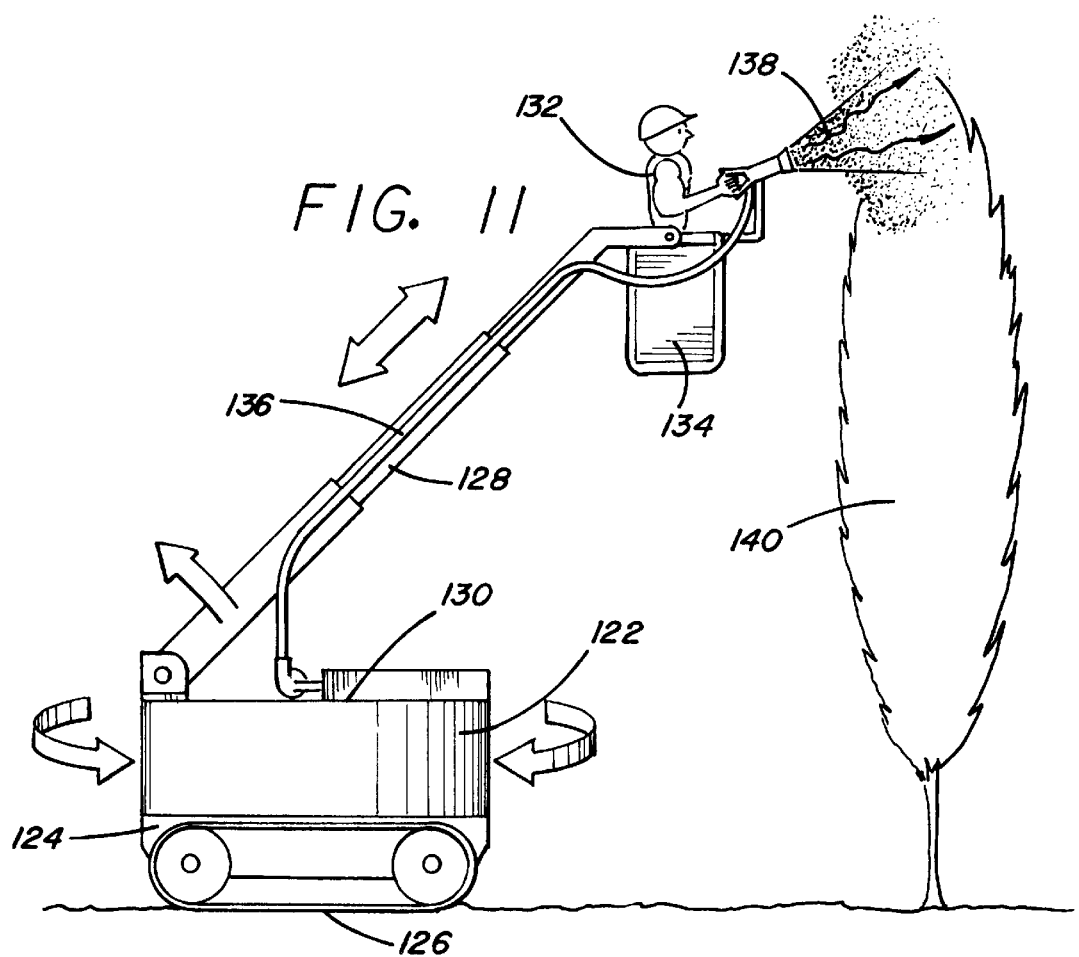
FIG. 11 is a side view of another embodiment of the present invention.

In another embodiment of the present invention shown in FIG. 11, the water tanks, heating unit, and compressor are located on a rotating base 122 that is attached to a base 124 having tank treads 126. A large telescoping arm 128 is attached to the top of the water tank portion 130 of the device. The telescoping arm 128 is of a sufficient size and strength that it can hold at least one person 132 in a basket 134 located at the end of the telescoping arm. A hose 136 carries the high pressure heated water 138 to the person 132 located within the basket 134 for spaying the hot water 138 on the tops of large trees 140 to eliminate ticks, scale, and whitefly and other insects.

Figure 12:
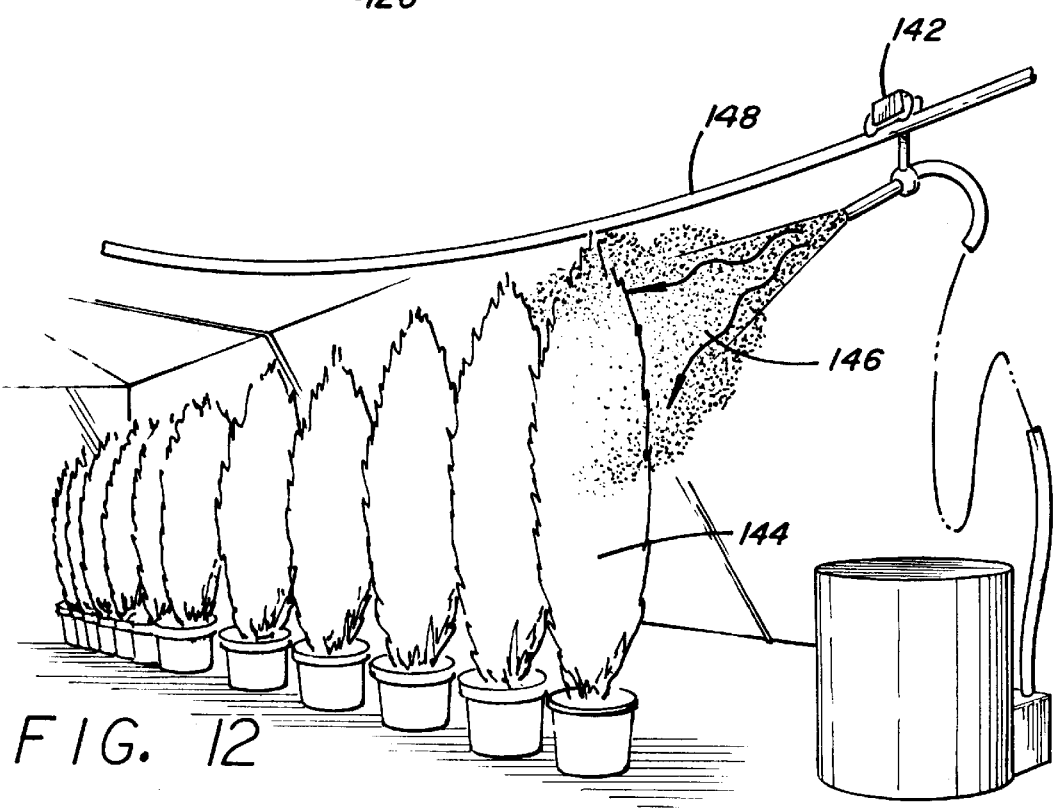
FIG. 12 is a side elevational view of another embodiment of the present invention.

In another embodiment of the present invention shown in FIG. 12, the vehicle 142 for spraying the plants 144 with heated, varying pressure water 146 is of such a size that it can maneuver in a small indoor area in a greenhouse. Such a vehicle 142 will work in substantially the same manner as the larger outdoor vehicles described above, i.e., there will be a water tank, a heating unit utilizing plastic coils in microwave ovens or piping, grills, or grids with exothermic paint, nozzles, and varying pressure, heated, pulsating ultrasonic spray of water for contacting the insects and the plants within the greenhouse. Because of the relatively tight space between plants 144 found in a greenhouse, the vehicle will have to be of such a size that it will fit within these spaces within the greenhouse. One way to permit the smaller vehicle for use in the greenhouse to apply the heated water to the plants is to provide a monorail system 148 throughout the greenhouse, both above and below the plants, whereby the vehicle can travel on the monorail and spray heated, varying pressure pulsating water onto the tops and bottoms of the leaves of the plants of the greenhouse in order to eliminate the insects and their eggs and larvae within the greenhouse and on the leaves of the plants.

Figure 13:
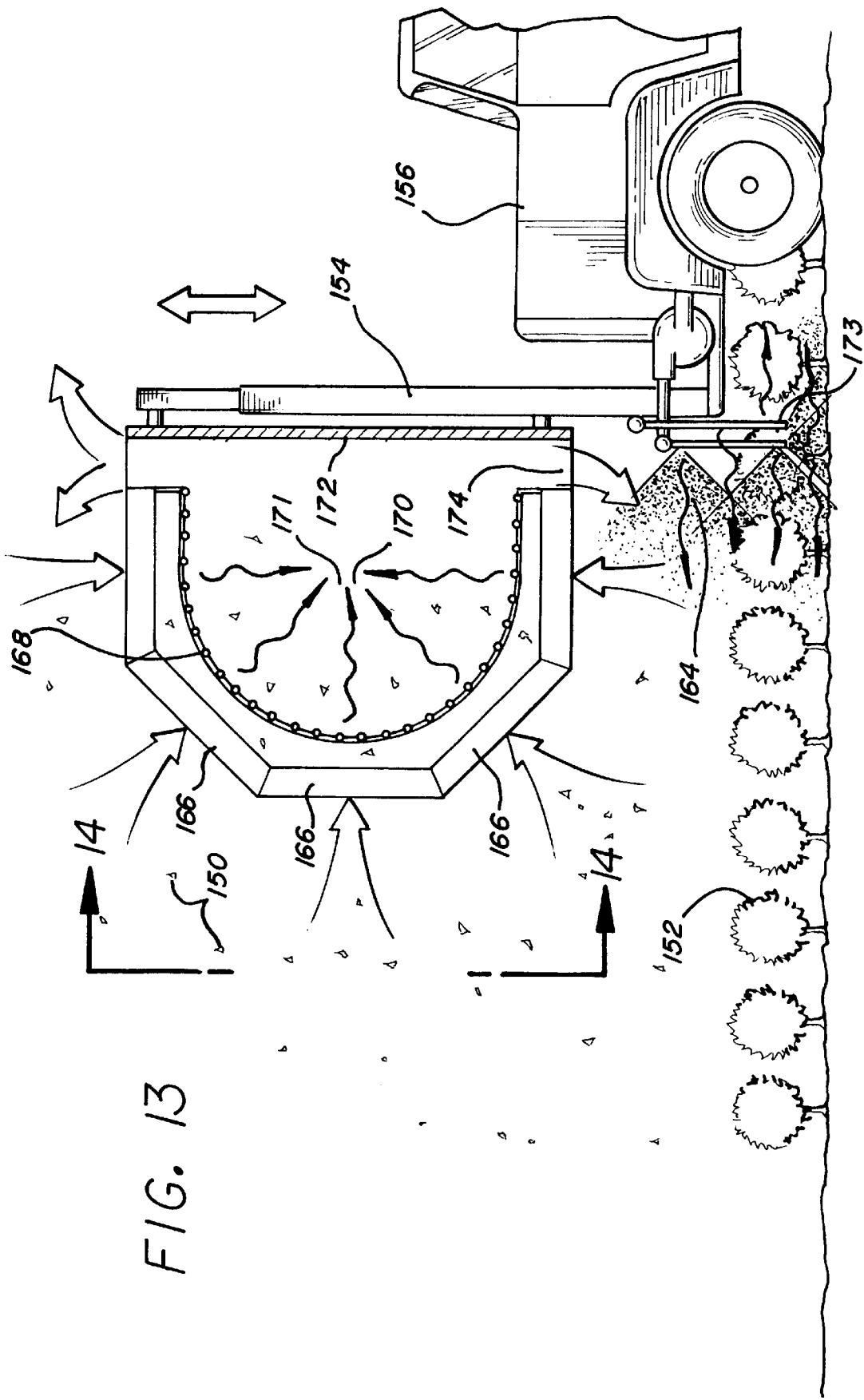
FIG. 13 is a side view of another embodiment of the present invention.
Figure 14:
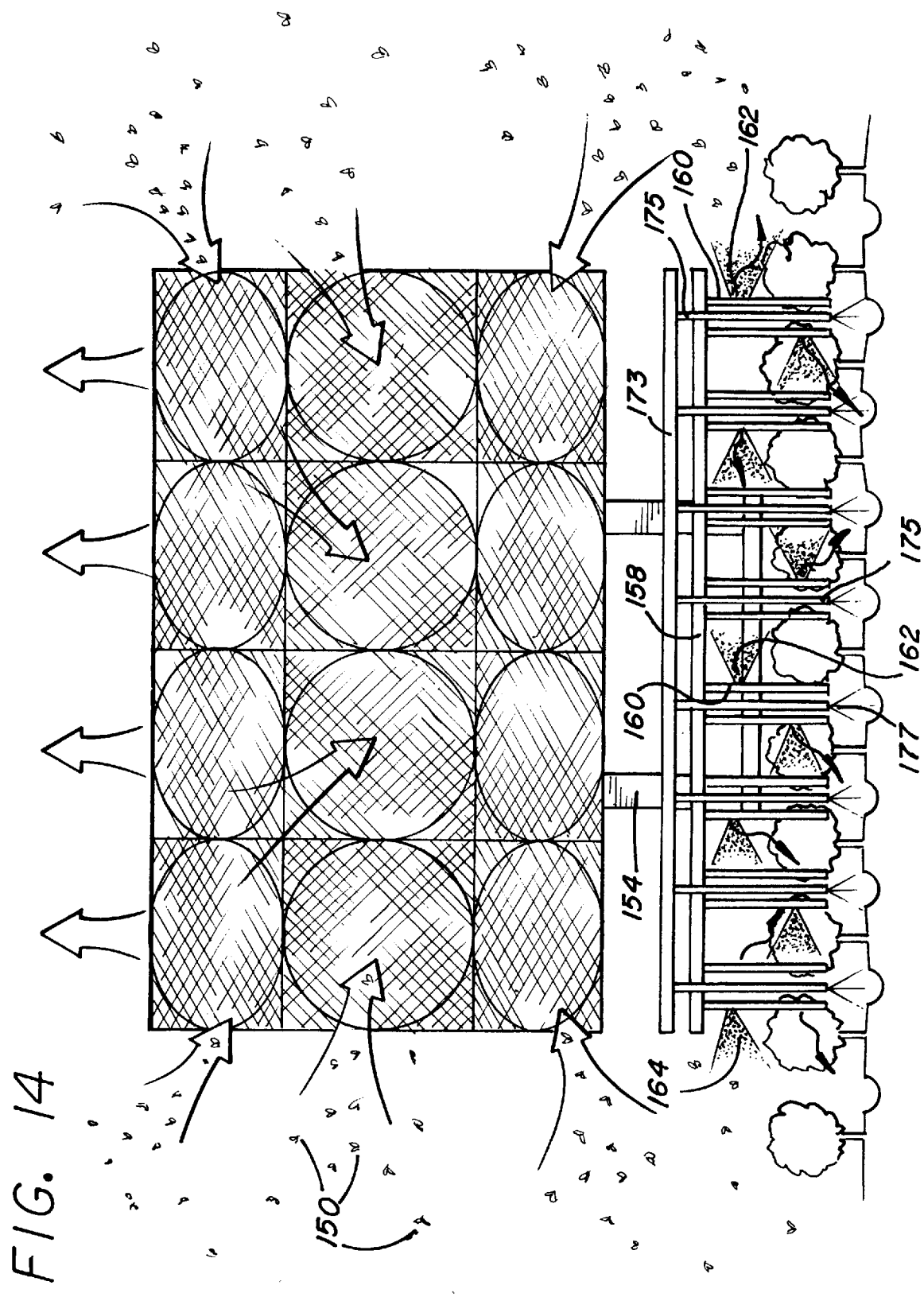
FIG. 14 is a front elevational view of the embodiment of the present invention shown in FIG. 13 and taken along the line 14—14.

In yet another embodiment of the present invention shown in FIGS. 13 and 14, the use of heated air and a heated grid is combined with the use of the heated water to eliminate the insects on and around the crops. The heated air and grid is necessary to eliminate insects 150 that may be flying above the crops 152 while the heated water of the other embodiments is being applied. Even though the heated water applied to the plants in the other embodiments may eliminate most of the insects, it cannot eliminate those that happen to be flying above the plants when the heated water is being applied. Thus, in order to completely eliminate the insects, the insects flying above the crops must also be eliminated.

In this embodiment, the device is carried on a fork-lift 154 located in front of the tractor 156 so that the device may be raised above a mature crop such as cotton. The device includes a water pipe 158 for supplying the water and includes piping 160 and openings 162 for spraying heated water 164 onto the plants and onto the ground beneath the plants to eliminate the insects, eggs and larvae as described above. Heated air is generated by the use of a series of fan banks 166 and heated, expanded grids. There are bank rows of high power, suction fans on this apparatus, which are configured into a semi-circular shape. The fans are situated to pull the air, and the insects contained in the air above the plants, into a center area 171 of the semi-circle formed by the fans as shown by the large arrows in FIG. 13. Inside the semi-circle 170 formed by the fans 166 and filing essentially the center area of the semi-circle are a series of expanded grids. These expanded grids are heated to a temperature of between 150° F. to 800° F. The heated grids heat the air to a temperature of between 150° F. to 800° F. within the semicircle 170 formed by the fans 166 to temperatures wherein the insects are killed by the high temperatures. The grids 168 are preferably formed from any heat conducting material that can withstand the high temperatures produced by the exothermic paint. Such materials are preferably metals or any other composite material having the requisite properties, as is well known to those of ordinary skill in the art. An insulated heat shield 172 is located at the opposite end of the semi-circle 170, away from the fans to prevent the heat from escaping and to permit the air from the fans to escape out an air vent 174 provided between the heat shield and the top of the fans. The heated air is also forced through a delivery pipe 173 and through a series of pipes 175 and out openings 177 on pipes 175 This heated air contacts the surface of the soil in the area between the crops to eliminate insects, larvae, eggs, and weeds therein.

The heated air and water combination of this embodiment of the present invention present the possibility of fire hazard should the weeds or plants be too dry. Accordingly, there may be provided one or more sets of water nozzles at the rear of the machine to douse out any possibility of fire.

Figure 15:
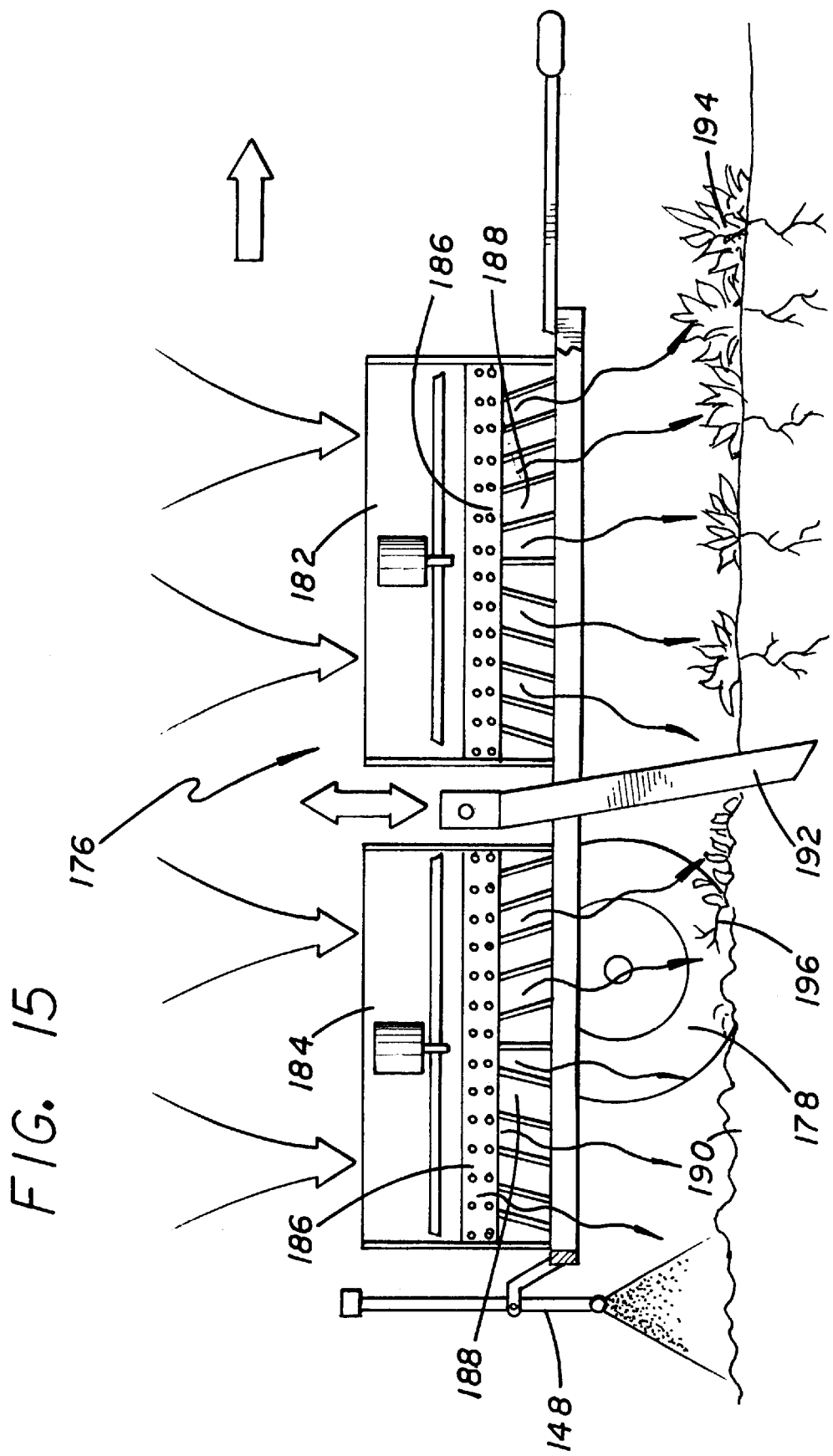
FIG. 15 is a side view of yet another embodiment of the present invention.
Figure 16:
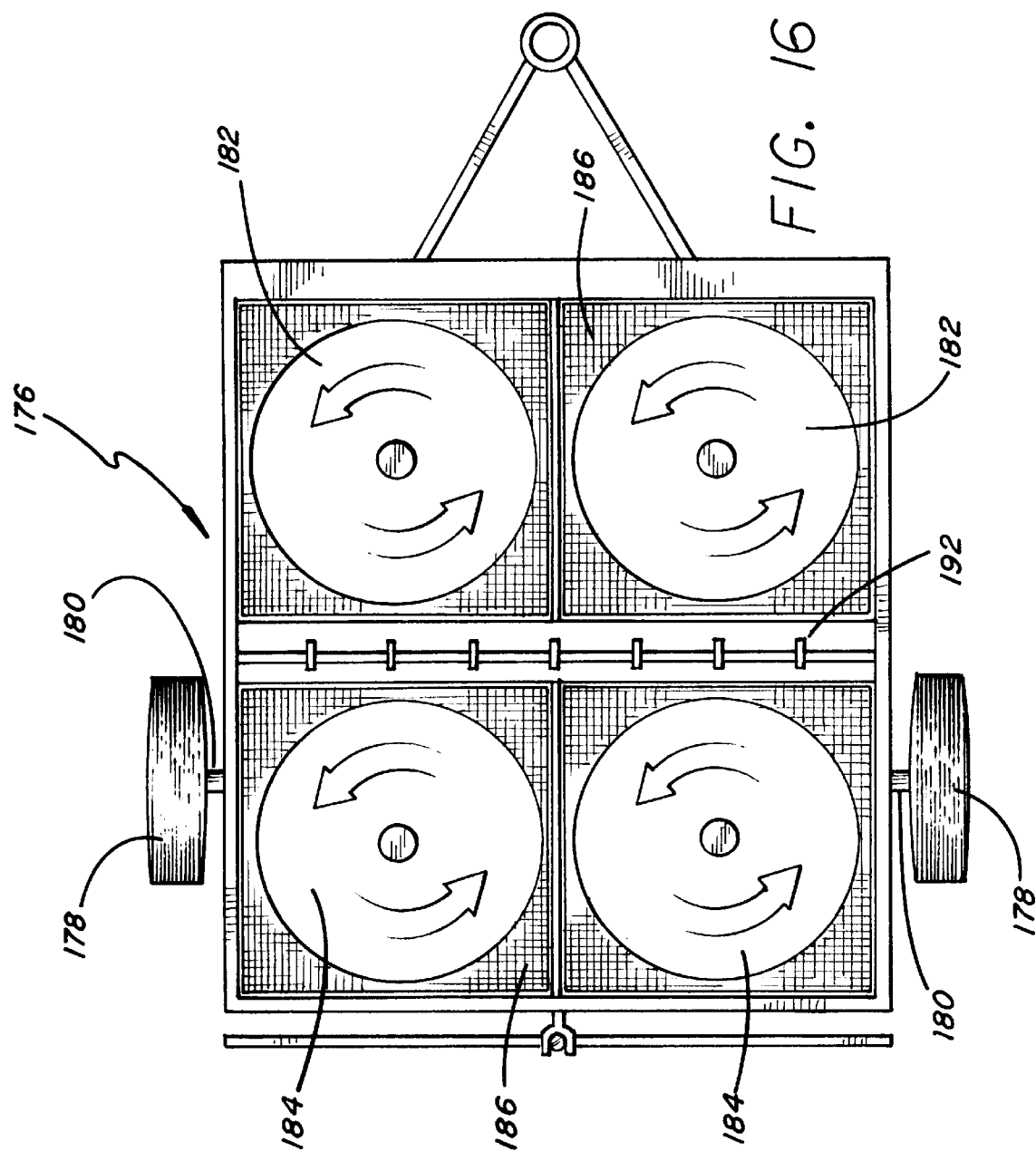
FIG. 16 is a top elevational view of the embodiment of the present invention shown in FIG. 15.

In yet another embodiment of the present invention shown in FIGS. 15 and 16, a device is provided which is used to herbicide and pesticide without chemicals. The device will effectively eliminate weeds and insects, larvae, and eggs remaining in a field after harvest and prior to cultivation and planting of the next year's crops. The device relies upon the use of controlled, extreme heat as applied in one pass to the undisturbed soil and to cultivated soil in order to effectively eliminate insects, larvae and eggs on the surface of the soil and to eliminate weeds and their roots that have been exposed following cultivation.

The device is comprised of a vehicle element 176 that has a set of wheels 178 and an axle 180. The vehicle element 176 is adapted to be pulled by a tractor or other vehicle under its own power. The vehicle element 176 is sized so as to fit between tree rows. The device is also sized so that it may be attached to the tractor at its rear end and may also have standard implements such as disk seeders, cultivators, etc., attached at its rear end.

The device has the advantage of being able to eliminate the insects, larvae, eggs, and weeds in the soil prior to cultivation with a minimal amount of water and energy usage. The device utilizes heated air to eliminate the insects, larvae, eggs, and weeds in and under the surface of the soil. The device has a first and second series of fans 182 and 184, respectively, which are situated on the vehicle element 176 of the device in stich a manner so as to pull air from above the device through the fan and onto a series of heating elements 188. The fans are each preferably 14 inches in diameter. The heating elements 186 may be any type of heating element that can heat the air passing over them to a temperature of between 800° F. to 1,700° F. The heating elements may be a metal, or any other composite material, grid that is coated with the exothermic paint described above and that is a conductor of heat and is able to withstand the high temperatures generated by the exothermic paint. A small current is passed through the paint to heat the paint to the desired temperature so that it may heat the air passing over the metal grids to the desired temperature. A series of vents 188 may be located below the heating element to direct the heated air onto the surface of the soil 190 located below. The vents 188 may also be heated by the use of exothermic paint or other known heating means. A height adjustment mechanism is also preferably included on the vehicle in order to adjust the height of the fans above the surface of the soil.

The heated air that passes through the first series of fans will be blown onto the surface of the soil 190. The soil below the first series of fans has preferably not been cultivated in order that the heated air will directly contact the surface of the soil. The heated air should eliminate all insects, larvae, and eggs located on the surface of the soil. Once these insects, eggs, and larvae located on the surface of the soil have been eliminated, the soil is then ready for cultivation. The soil should not be cultivated prior to treatment with the heated air, because there is the possibility that larvae and eggs may be buried in the soil and thereby avoid being eliminated by the heated air and thus be able to hatch when the new crop has been planted.

Located in between the first and the second series of fans is a series of soil blades 192. The soil blades are designed to dig into the soil and pull up the roots of the weeds 194 located within the soil. Most methods of eliminating weeds using hot water, do not attack the roots of the weeds. Often the roots are able to survive hot water treatment, and thus the weeds will grow back some time following the initial treatment and a later treatment will be necessary. Thus, the soil blade of the present invention will lift the roots 196 of the weeds and expose them to treatment with heated air by the second series of fans 184, as the second series of fans 184 passes over the exposed roots and soil. The soil blade 192 will also expose any larvae and eggs that were buried in the soil and were not eliminated by the heated air of the first series of fans.

The device may also include a water supply and water sprayers 198 at the rear end of the device for spraying water onto the soil as the device passes over the soil. The purpose of spraying the water onto the soil following the treatment by both series of fans is to douse out any fires that may have formed as a result of the treatment with the heated air. Further, a water pipe may carry the water to the rear of the implement that is connected to the device in order to spray the water onto the soil in order to control the amount of dust that is drawn up and into the air behind the devices.

While a particular form of the invention has been illustrated and described, it will be apparent that various modifications can be made without departing from the scope of the invention. Accordingly, it is not intended that the invention be limited by the specific embodiment disclosed in the drawings and described in detail hereinabove.

I claim:

1. An apparatus for the control of insects on and around cropping and growing plants, without the use of any chemicals and without causing any significant harm to the growing and cropping plants, the apparatus comprising:

a first vehicle element;

a second vehicle element coupled to the first vehicle element, the second vehicle element capable of causing the first vehicle element to move through a field;

at least two fans attached to the first vehicle element, the fans being arranged in a substantially semi-circular configuration defining a central area, the fans pulling air and insects flying within the air from above the height of the cropping and growing plants towards the central area and wherein the fans are located at a predetermined height above the height of the cropping and growing plants, the height of the fans being adjustable;

at least one heated grid element for heating the air and insects that were pulled towards the central area by the fans, the heated grid element being attached to the first vehicle element and being configured in substantially the same configuration as the fans and so that the fans blow the air and insects through the grid element as they pass towards the central area; and wherein the air and insects are heated to a sufficient temperature as they pass through the grid element and into the central area, such that substantially all of the insects flying above the growing and cropping plants are destroyed, but the cropping and growing plants are not destroyed.

2. The apparatus of claim 1, wherein the second vehicle includes a tank for storing a supply of water;

a heating element for heating the water;

a compressor for pressurizing the heated water; and a plurality of nozzles for spraying the heated water in a pulsating manner onto the cropping and growing plants;

wherein the water is heated to a certain temperature and sprayed onto the cropping and growing plants and on the soil for a certain period of time such that substantially all of the insects, their larvae and eggs above, on, and around the cropping and growing plants are destroyed, but the cropping and growing plants are not destroyed.

3. The apparatus of claim 1, wherein the heated grid element is heated to a temperature of between approximately 150° F. to 350° F.

4. The apparatus of claim 1, wherein the heated grid element is an expanded grid that is coated with an exothermic paint.

5. The apparatus claim 1, wherein there is a portion of ground under and around the growing and cropping plants and wherein the fans blow heated air through conduits and onto the ground under and around the growing and cropping plants.

6. A method for the control of insects, larvae, and eggs that are located on, above, and below cropping and growing plants, without the use of any chemicals and without causing any significant harm to the growing and cropping plants, the method comprising the steps of:

providing at least two fans arranged in a substantially semi-circular configuration defining a central area;

pulling the air and insects from above the cropping plants towards the central area with at least two fans;

passing the air and insects through a heating element into the central area, thereby heating the air and insects to a temperature of between approximately 150° F. and 800° F.; and spraying the plants and the soil with a pulsating, ultrasonic stream of water at a temperature of between approximately 150° F. and 800° F. for no more than five (5) seconds;

thereby destroying a substantial amount of the insects, larvae, and eggs located on, above, and below the cropping and growing plants without causing any significant harm to the growing and cropping plants.

* * * * *